(12) United States Patent
Meyers et al.

(10) Patent No.: US 11,921,204 B2
(45) Date of Patent: Mar. 5, 2024

(54) LIDAR SYSTEM AND METHOD

(71) Applicant: General Electric Company, Schenectady, NY (US)

(72) Inventors: Mark Marshall Meyers, Niskayuna, NY (US); Michael Feldmann, Grand Rapids, MI (US); Loucas Tsakalakos, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 17/371,347

(22) Filed: Jul. 9, 2021

(65) Prior Publication Data
US 2022/0035032 A1 Feb. 3, 2022

Related U.S. Application Data

(60) Continuation of application No. 17/164,774, filed on Feb. 1, 2021, now abandoned, which is a division of
(Continued)

(51) Int. Cl.
*G01S 17/08* (2006.01)
*G01S 7/481* (2006.01)
(Continued)

(52) U.S. Cl.
CPC ............ *G01S 17/08* (2013.01); *G01S 7/4812* (2013.01); *G01S 7/4814* (2013.01);
(Continued)

(58) Field of Classification Search
None
See application file for complete search history.

(56) References Cited

U.S. PATENT DOCUMENTS

| 8,244,026 B2 | 8/2012 | Nahari et al. |
| 9,063,549 B1 | 6/2015 | Pennecot et al. |
| (Continued) | | |

FOREIGN PATENT DOCUMENTS

| CN | 104898125 A | 9/2015 |
| CN | 105659108 A | 6/2016 |
| (Continued) | | |

OTHER PUBLICATIONS

Abed "Designing High Reflectivity Omnidirectional Coating of Mirrors for Near Infrared Spectrum," Applied Physics Research; vol. 5, No. 1; 2013.
(Continued)

*Primary Examiner* — Hovhannes Baghdasaryan
(74) *Attorney, Agent, or Firm* — Enang Akan; Darrow Mustafa PC

(57) ABSTRACT

A light detection and ranging (LiDAR) system includes light sources configured to generate separate beams of light, a lens array configured to receive the separate beams of light from the light sources and to collimate the separate beams of light into collimated outgoing light that is directed toward an examined area of interest, a light sensitive detector configured to sense reflection of at least part of the collimated outgoing light, and one or more processors configured to determine a distance to one or more objects off which the at least part of the collimated outgoing light was reflected toward the light sensitive detector. The one or more processors are configured to determine the distance based on the reflection of the at least part of the collimated outgoing light.

8 Claims, 5 Drawing Sheets

Related U.S. Application Data application No. 15/482,339, filed on Apr. 7, 2017, now Pat. No. 10,908,282.

(51) Int. Cl.

| | | |
|---|---|---|
| *G01S 17/10* | (2020.01) | |
| *G01S 17/42* | (2006.01) | |
| *G01S 17/89* | (2020.01) | |
| *G01S 17/931* | (2020.01) | |

(52) U.S. Cl.
CPC .......... *G01S 7/4815* (2013.01); *G01S 7/4816* (2013.01); *G01S 7/4817* (2013.01); *G01S 17/10* (2013.01); *G01S 17/42* (2013.01); *G01S 17/89* (2013.01); *G01S 17/931* (2020.01)

(56) References Cited

U.S. PATENT DOCUMENTS

| | | | |
|---|---|---|---|
| 9,097,800 | B1 | 8/2015 | Zhu |
| 9,360,554 | B2 | 6/2016 | Retterath et al. |
| 9,501,839 | B1 | 11/2016 | Korchev et al. |
| 2007/0181810 | A1 | 8/2007 | Tan et al. |
| 2009/0262415 | A1* | 10/2009 | Cottingame ............ G01S 7/484 |
| | | | 359/341.1 |
| 2009/0273770 | A1 | 11/2009 | Bauhahn et al. |
| 2010/0008588 | A1 | 1/2010 | Feldkhun et al. |
| 2014/0168631 | A1 | 6/2014 | Haslim et al. |
| 2015/0026083 | A1 | 1/2015 | Paliwal et al. |
| 2015/0260830 | A1 | 9/2015 | Ghosh et al. |
| 2015/0377696 | A1* | 12/2015 | Shpunt ..................... G01J 1/44 |
| | | | 359/796 |
| 2016/0047903 | A1* | 2/2016 | Dussan .................. G01S 17/42 |
| | | | 356/5.01 |
| 2016/0259038 | A1 | 9/2016 | Retterath et al. |

FOREIGN PATENT DOCUMENTS

| | | |
|---|---|---|
| JP | H112679 A | 1/1999 |
| JP | 2006177695 A | 7/2006 |
| JP | 2007214564 A | 8/2007 |
| JP | 2012154806 A | 8/2012 |
| JP | 2015514965 A | 5/2015 |
| JP | 2017003785 A | 1/2017 |
| KR | 101047171 B1 | 7/2011 |
| KR | 20140138724 A | 12/2014 |

OTHER PUBLICATIONS

Azim et al. "Detection, classification and tracking of moving objects in a 3D environment," Intelligent Vehicles Symposium (IV), 2012 IEEE, p. 802-807, 2012, Alcala de Henares.

University of Iowa "Metal Coating," Central Microscopy Research Facility, Researcher Handbook, https://cmrf.research.iowa.edu/metal-coating.

Yapo et al. "A probabilistic representation of LiDAR range data for efficient 3D object detection," Computer Vision and Pattern Recognition Workshops, 2008. CVPRW '08. IEEE Computer Society Conference on, p. 1-8, 2008, Anchorage, AK.

* cited by examiner

LIDAR SYSTEM AND METHOD

FIELD

The subject matter described herein relates to distance measuring systems, such as LIDAR systems.

CROSS-REFERENCE TO RELATED APPLICATIONS

This application is a continuation of and claims the benefit of U.S. Non-Provisional Patent Application No. 17/164,774, filed Feb. 1, 2021, which is a Division of and claims the benefit of U.S. Non-Provisional Patent Application No. 15/482,339, filed Apr. 7, 2017, both of which are hereby incorporated by reference in their entirety.

BACKGROUND

Various distance measuring systems operate to determine how far an object is from the systems and/or to determine when an object is present within a field of view or area under examination by the distance measuring systems. One example of such a distance measuring system is a light detection and ranging (LiDAR) system. A LiDAR system operates by directing light toward an object or area under examination. At least part of the light may be reflected off the object. The LiDAR system examines the time delay between emitting the light and receiving the reflection of the light (also referred to as a time of flight of the reflected light). Based on this time delay, the LiDAR system can determine how far the object is from the LiDAR system.

Some known LiDAR systems use one or more points of light or light beams to determine distances to objects or the presence of an object. In order to cover larger areas, the point or points of light are moved, such as by moving the sources of the light, relative to the area being examined or monitored by the LiDAR system. This movement can involve rastering the point or points of light back-and-forth along opposite directions and gradually moving the back-and-forth rastering of the light in another direction, such as a downward direction. While this approach can allow the LiDAR system to cover a larger area, the rastering of the light adds additional mechanical complexity to the LiDAR system and additional cost to the LiDAR system.

Additionally, the signal-to-noise ratio (SNR) of the detection of the reflected light may suffer due to individual points of light covering much larger areas during the rastering movement of the light. The SNR may be increased by adding a significant number of light sources, but this also adds cost and complexity to the LiDAR system.

BRIEF DESCRIPTION

In one embodiment, a LiDAR system includes light sources configured to generate separate beams of light, a lens array configured to receive the separate beams of light from the light sources and to collimate the separate beams of light into collimated outgoing light that is directed toward an examined area of interest, a light sensitive detector configured to sense reflection of at least part of the collimated outgoing light, and one or more processors configured to determine a distance to one or more objects off which the at least part of the collimated outgoing light was reflected toward the light sensitive detector. The one or more processors are configured to determine the distance based on the reflection of the at least part of the collimated outgoing light.

In one embodiment, another LiDAR system includes a lens array configured to receive separate points of light from light sources and to collimate the separate beams of light, a light sensitive detector configured to sense reflection of at least part of the light that is collimated, and one or more processors configured to determine a distance to one or more objects based on the reflection of the at least part of the light was reflected.

In one embodiment, a method includes coupling light sources onto a heat spreading substrate, coupling the substrate to a thermoelectric cooler, and coupling the substrate in a package having a bonded, integral lens array disposed along one edge of the package. The lens array is configured to receive separate beams of light from the light sources and to collimate the separate beams of light in multiple, different directions.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
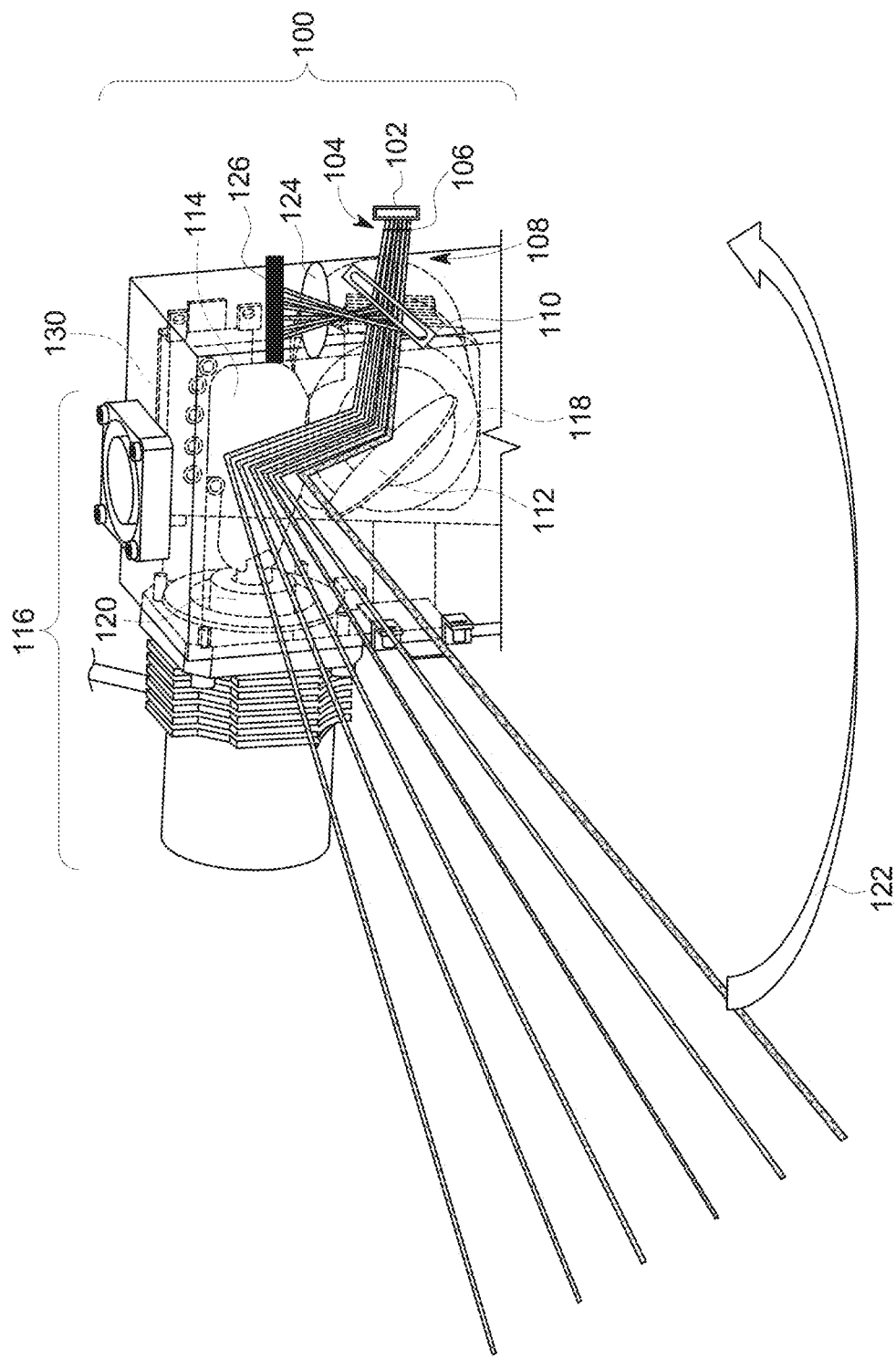
FIG. 1 illustrates one embodiment of a LiDAR system.

The inventive subject matter described herein provides LiDAR systems and methods that use elongated shapes of light (e.g., lines of light) to determine distances to objects and/or detect the presence of objects in an area being monitored by the systems and methods (e.g., fields of view of the LiDAR systems). The resultant measurements can then be used by the LiDAR system or another system to determine the size, shape, position, orientation, velocity, and the like, of objects that fall within the field of regard of the LiDAR system.

The light formed by the lens array can be swept (e.g., moved) in one or more directions. For example, the LiDAR system can move a scanning mirror actuated by a galvanometer, MEMS actuator, or the like, to move the light along horizontal directions. This can allow for the LiDAR system to cover a range of angles that constitutes the field of regard of the LiDAR system. A second scanning mirror can be used to sweep the beams of light over a fraction of the orthogonal field of regard to fill in the areas between the light arrays.

The LiDAR can send a timed pulse from each of the light sources and monitor reflected light from objects in the field of regard using an array of photodetectors. The photodetectors are configured to receive light from different sections of the field of regard, and generate signals that are used by a controller of the LiDAR system to determine the time of flight of any light pulses reflected from objects within the field of regard. The pulses emitted from the light sources are synchronized with the corresponding element in the detector array via pulse encoding and the optical layout of the LiDAR system. When a photodetector receives a pulse from reflected from an object within the field of regard, the distance to the object can be determined by multiplying the time of flight (the amount of time between when the pulse was transmitted and when the reflection of the pulse of light was received) by the speed of light.

By utilizing an array of light sources and photodetectors, the LiDAR system can integrate the reflected light from an object over a longer period of time. This results in improved SNRs for a given scan frequency, and/or can allow for a higher scan frequency to be used relative to some known LiDAR systems that do not include the lens arrays described herein.

One or more embodiments of the lens arrays collimate the light from the light sources in multiple directions (e.g., in the horizontal direction and in the vertical direction). This results in a fan of collimated light beams emanating from the lens array, which covers the vertical field of view of the LiDAR system. This fan of light beams can be swept horizontally by a scanning MEMs mirror or a galvanometer with a large range (e.g., thirty to one hundred twenty degrees). A second scanning mirror can deflect the light beams vertically to fill in the grid between the adjacent light sources with a small angular range between the angularly offset light sources (e.g., one to ten degrees). This generates a set of scanned beams (e.g., four to fifty light beams) that simultaneously probe the area within a section of the field of view of the LiDAR system.

The LiDAR system can operate by emitting a short laser light pulse (or set of pulses) from each individual laser which is collimated and directed by the micro lens array in one direction. The collimated beams are swept over the field of view by a scanning mirror. If there is an object within the field of view, light will be scattered and reflected back towards the LIDAR. The reflected light is then incident on the receiving optic and focused onto an array of NIR detectors such as InGaAs or Ge, which are arranged such that they only receive light from the corresponding section of the FOV associated with a specific laser in the laser array.

With respect to one embodiment of a detector array that senses the reflected light, an array of the same number of detectors as there are light sources is arranged behind a focusing optic (e.g., one or more lenses) that receives scattered and de-scanned light from the field of regard. This light has been reflected off a polarizing beam splitter (PBS) placed between the scanning mirrors and the light sources. The outgoing light from the light sources is polarized and aligned with a transmission axis of the PBS. Light reflected and scattered from the field of view of the detector array experiences a polarization rotation which will allows some of the light to be received by the detector array after reflecting off the PBS. The received light will have been angularly de-scanned, and will have come from the area illuminated by the associated light source. The round-trip distance to a target object can be determined by measuring the time delay between the emission of a narrow pulse from the light source to the reception of a pulse at the associated detector the array and multiplying this time by the speed of light.

Optionally, an array of near infrared (NIR) photodetectors (e.g., an array of 1280 by 1024 detectors, for example) which monitors the field of view through an imaging lens with a larger numerical aperture that collects more light from the field of view of the LiDAR system. The detector array can be alternative current (AC) coupled and can output a signal from a given pixel within a short period of time (e.g., two to five nanoseconds) of the time that the detector array detects an event (e.g., receipt of a reflected light pulse) within a field of view of the detector array. This can allow the detection of the reflected light pulse such that the detection can be correlated (e.g., matched) to the emission of a pulse by the light sources to allow the distance to the object to be determined.

At least one technical effect of the inventive subject matter described herein allows for mapping of the three-dimensional (3D) space in front of the LiDAR system. By creating a 3D map of the space in front of the system, the output of the system can be used for applications such as navigation and detection of the presence of objects in front of moving vehicles, in front of autonomous devices such as robots and drones, in secure or monitored areas, etc. Detecting the presence of objects in front of or at the edge of roads can allow for navigation of vehicles, which allows the vehicles to avoid collisions.

One or more embodiments of the LiDAR systems described herein utilize laser diodes with a wavelength in the 1500 to 1700 nanometer (nm) NIR wavelength range. Compared to other LiDAR systems operating with light in the range of 700 to 1000 nm wavelength, the light sources (e.g., laser diodes) of one or more embodiments of the inventive subject matter experience lower atmospheric attenuation and are therefore capable of operating over a larger propagation range. The longer wavelengths also experience reduced Rayleigh scattering during propagation through atmosphere. Rayleigh scattering is inversely proportional to the wavelength to the fourth power of the light wavelength, which enables one or more embodiments of the LiDAR systems to exhibit superior functionality in the presence of rain, fog, and particulates compared to prior art systems operating in the 700 to 1000 nm wavelength range. Additionally, lasers operating in the longer wavelength range are significantly less of an eye hazard than lasers operating in the shorter 700 to 1000 nm wavelength range, which reduces the hazard to people in the field of regard of the LiDAR system.

One or more embodiments of the inventive subject matter described herein can achieve a higher fidelity map of the 3D space in front of a LiDAR system by using an array of light sources, each of which probe a section of the full field of regard of the LiDAR system at the same time (e.g., simultaneously). This can allow for a higher signal to noise ratio on the measured distance to objects while using less expensive components than other LiDAR systems that do not include the lens arrays described herein. The inventive subject matter described herein also can allow for longer sensing ranges and/or reduced sensitivity to rain, fog, and particulates due to the use of lasers operating in the 1500 to 1700 nm wavelength range in one embodiment. Additionally, by dividing the field of view of the LiDAR system by the number of light sources, the LiDAR system can spend more time (e.g., processing time) checking for the presence of objects within the field of regard in front of the LIDAR system. This is because the LiDAR system can operate at a slower scan rate than a LiDAR system using a single laser beam or operating without the lens array described herein. The scan rate is divided by the number of light sources used in the LiDAR system, and may include four to fifty beams working in parallel in one example. The slower scan rate allows for more laser dwell time on the target, which provides for a higher signal to noise ratio on the detector or can be utilized to allow for the use of a lower power, and lower cost laser source for each beam.

FIG. 1 illustrates one embodiment of a LiDAR system 100. The LiDAR system 100 includes an array 102 of multiple light sources (not visible in FIG. 1) that separately generate light or light beams 104 toward a lens array assembly 106. These light sources can be photodiodes and/or laser diodes that generate different (e.g., separate) beams of light 104 into different areas of the lens array assembly 106. As described below, the lens array assembly 106 can include multiple micro lenses (also referred to as lens elements) that each receives light 104 from a different light source in the light source array 102. The light sources can all generate light having the same or substantially the same (e.g., within 3%) wavelength, such as 980 nanometers, 1550 nanometers, or 1570 nanometers. This light 104 is received by the lens elements in the lens array 106 into or through a back surface or side of each lens element. The light 104 that is generated by the light sources and received by the lens elements can be referred to as incoming light 104.

The incoming light 104 passes through the lens elements in the lens array 106, is collimated by the lens elements, and exits or emanates from opposite front surfaces or sides of the lens elements as outgoing light 108. The lens elements in the lens array 106 collimate the incoming light 104 in multiple directions such that the outgoing light 108 emanating from the front surfaces or sides of the lens elements is collimated in a first direction (e.g., a vertical direction) and is collimated in a different, second direction (e.g., a horizontal direction).

The collimated outgoing light 108 passes through a polarizing beam splitter 110 that allows the outgoing light 108 to pass through the beam splitter 110. This outgoing light 108 is reflected off multiple mirrors or reflective surfaces 112, 114 of a mirror assembly 116. A first mirror surface 112 is coupled with and moveable by a first motor 118 of the mirror assembly 116. The motor 118 rotates the first mirror surface 112 about an axis (that is approximately perpendicular to the page of FIG. 1) to direct or move the outgoing light 108 along opposite first directions. The light 108 reflects off the first mirror surface 112 and strikes a second mirror surface 114 of the mirror assembly 116. The second mirror surface 114 is coupled with and moveable by a different, second motor 120 of the mirror assembly 116. The motor 120 rotates the second mirror surface 114 about a different axis (that is approximately parallel to the page of FIG. 1) to direct or move the outgoing light 108 along opposite second directions. The light 108 reflects off the second mirror surface 114 and is directed toward a field of regard of the LiDAR system 100.

A controller 130 of the mirror assembly 116 can control movement of the mirrors 112, 114 to control where the light 108 emanating from the LiDAR system 100 is directed. Although not visible in FIG. 1, the controller can include hardware circuitry that includes and/or is connected with one or more processors (e.g., one or more microprocessors, field programmable gate arrays, and/or integrated circuits) that generate the control signals communicated to the motors 118, 120 to control where the light 108 is directed. The controller can control movement of the mirrors 112, 114 by the respective motors 118, 120 to cause the separate beams of light 108 to sweep back-and-forth across the field of regard, as shown in FIG. 1 by an arrow 122 illustrating movement of the beams of light 108 back-and-forth from the perspective of the viewer.

The light 108 can strike one or more objects within the field of regard of the LiDAR system 100 and at least partially reflect off the object(s). The reflected light is at least partially received by the mirror 114, reflected off the mirror 114 toward the mirror 112, and reflected off the mirror 112 toward the beam splitter 110. The reflected light (traveling in an opposite direction as the outgoing light 108 from the lens array 106) can have a randomized polarization. The portion of the reflected light having an orthogonal polarization to the outgoing light 108 is directed by the beam splitter 110 toward a lens 124. The lens 124 focuses the reflected light onto a detector array 126, which can include photodetectors that generate signals that are indicative of receipt of the light. These signals can be communicated to a controller (which may be the same controller that controls operation of the mirror assembly 116 or another controller), which calculates a time of flight as the time period between transmission of a pulse of the outgoing light 108 and receipt of the reflected light on the detector array 126. This time of flight can be used to calculate a distance to the object(s) off of which the light 108 was reflected to determine a presence and/or distance to the object(s).

Figure 2:
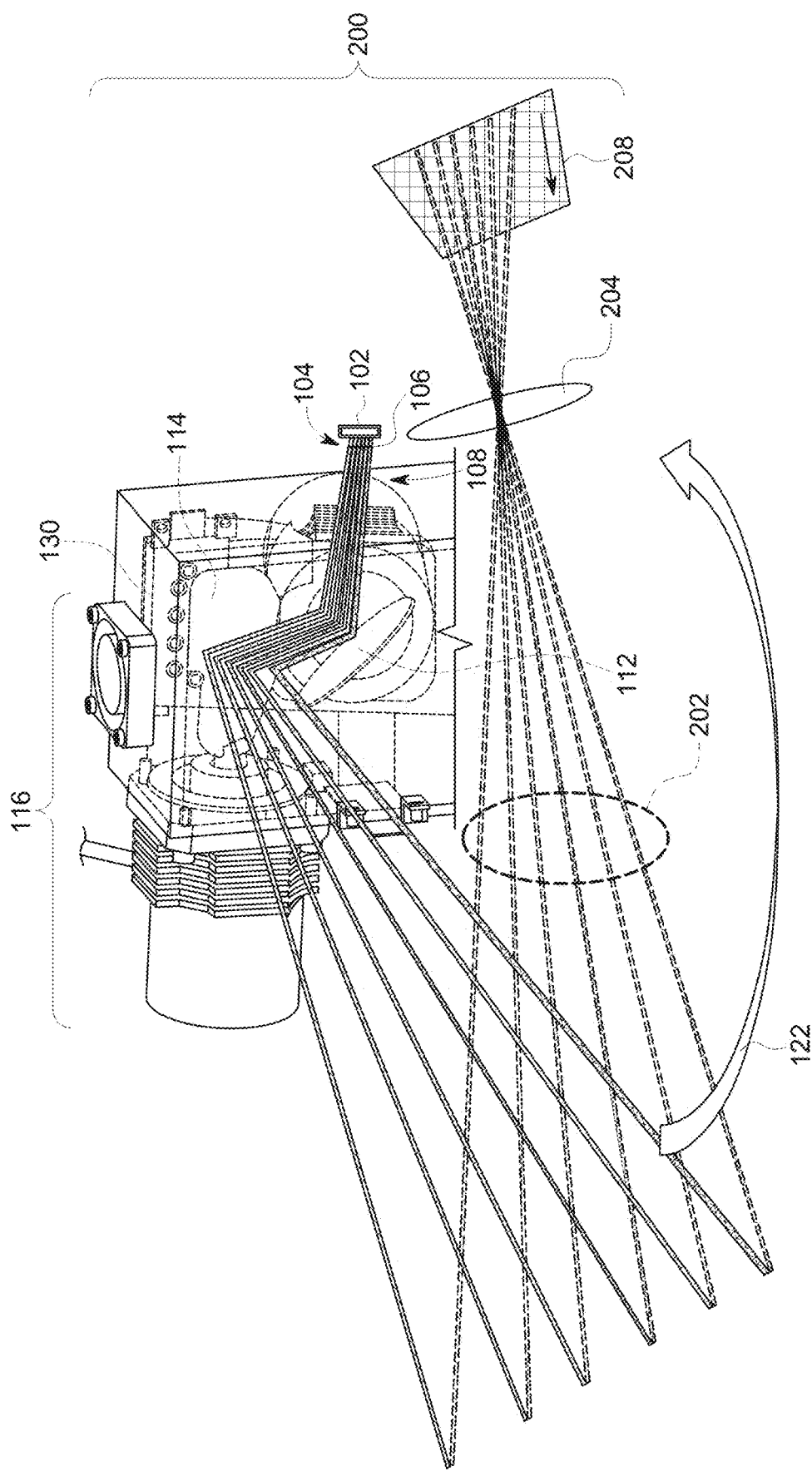
FIG. 2 illustrates another embodiment of a LiDAR system.

FIG. 2 illustrates another embodiment of a LiDAR system 200. The LiDAR system 200 includes the array 102 of light sources and the lens array assembly 106 described above. The incoming light 104 generated by the light sources passes through the lens elements in the lens array 106, is collimated by the lens elements (e.g., in both horizontal and vertical directions), and exits or emanates from opposite front surfaces or sides of the lens elements as the outgoing light 108. The outgoing light 108 is reflected off the moveable mirrors 112, 114 of the mirror assembly 116, as described above.

The light 108 can strike one or more objects within the field of regard of the LiDAR system 200 and at least partially reflect off the object(s) as reflected light 202. The reflected light 202 is at least partially received by a lens 204 that focuses the light 202 toward a detector array 208, which can include photodetectors that generate signals that are indicative of receipt of the light, similar to as described above. The lens 204 of the LiDAR system 200 can have a larger numerical aperture than the lens 124 of the LiDAR system 100. The detector arrays 126, 208 can include silicon (Si) or indium gallium arsenic (InGaAs) photodetectors. In one embodiment, one or more of the detector arrays 126, 208 is a near infrared (NIR) photodetector array.

Use of the mirror assembly 116 in the LiDAR systems 100, 200 can provide for a field of regard of the systems 100, 200 that extends over one hundred twenty degrees, with the line of light 108 emanating toward the field of regard from the lens assembly 106 extending over sixty degrees. The mirrors 112, 114 in the mirror assembly 116 can rotate at a relatively slow velocity to allow the light 108 to dwell over longer periods of time in the field of regard. This can reduce the cost and complexity of the electronic hardware used to control movement of the mirrors 112, 114, while increasing the signal-to-noise ratio of the reflected light relative to LiDAR systems that do not use the mirror assembly 116.

Figure 3:
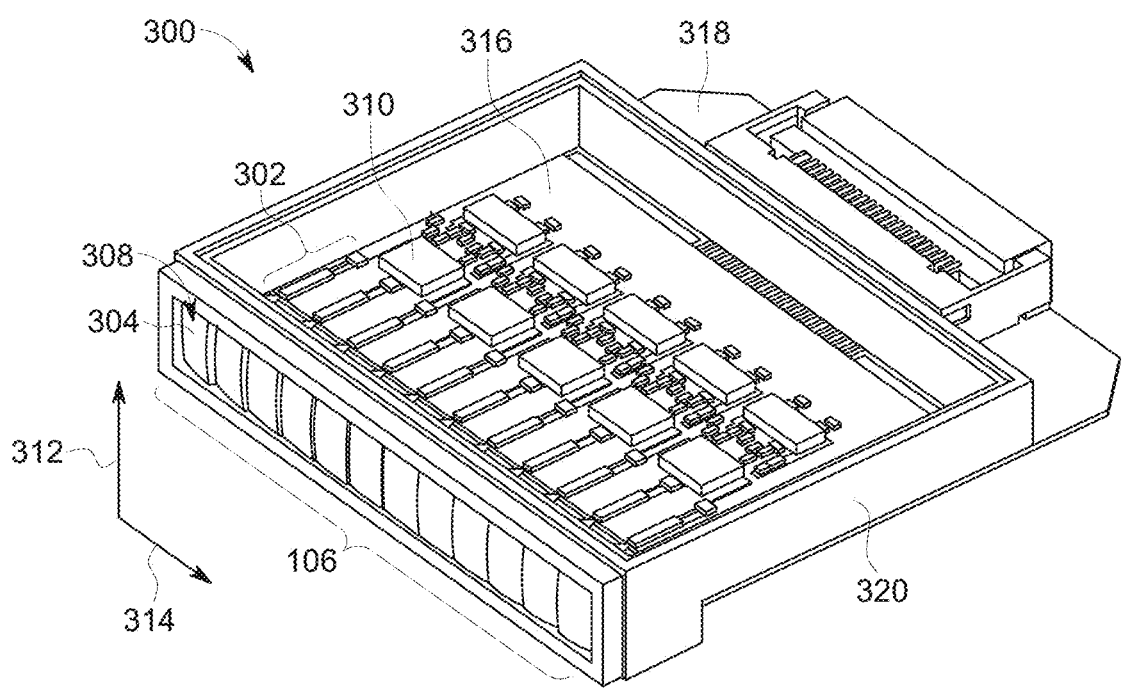
FIG. 3 illustrates one embodiment of a lighting assembly that can be included in one or more of the LiDAR systems described herein.

FIG. 3 illustrates one embodiment of a lighting assembly 300 that can be included in one or more of the LiDAR systems 100, 200 described herein. The lighting assembly 300 includes several light sources 302 that generate light toward the lens array assembly 106. These light sources 302 can be photodiodes and/or laser diodes that generate different beams of light into different areas of the lens array assembly 106. For example, the lens array assembly 106 can include multiple micro lenses or lens elements 304 that each receives light from a different light source 302. In the illustrated embodiment, the lens array assembly 106 includes twelve lens elements, or lenses, 304. Alternatively, the lens array assembly 106 can include a single lens element 304 or a different number of lens elements 304.

The light sources 302 can all generate light having the same or substantially the same (e.g., within 3%) wavelength, such as 980 nanometers, 1550 nanometers, or 1570 nanometers. This light is received by the lens elements 304 into or through a back surface or side 306 (shown in FIG. 5) of each lens element 304. The light that is generated by the light sources 302 and received by the lens elements 304 is the incoming light 104. The light 104 passes through the lens elements 304, is collimated by the lens elements 304, and exits or emanates from opposite front surfaces or sides 308 of the lens elements 304 as outgoing light. Current driving circuitry 310 can control the light output by each light source 302. Optionally, another type of light source 302 can be used, or at least one of the light sources 302 can generate light that is received by two or more of the lens elements 304.

The circuitry 310 and light sources 302 can be mounted onto a heat spreading substrate 316, such as a metal or other thermally conductive body. For example, the substrate 316 can be formed from aluminum nitride, graphene, or a silicon-based interposer with integrated interconnects and bond pads for conductively coupling the light sources 302 with the circuitry 310. The substrate 316 is in a package 320 and bonded to a thermoelectric cooler or cooling device 318, with the lens array 106 disposed along one edge of the package 320. The package 320 optionally can be referred to as an outer housing or housing of the lighting assembly. The lens array 106 can be a single, integral body that includes the several different lens elements 304. The package 320 can be formed from metal, ceramic, and/or plastic, and can be created using three-dimensional printing, injection molding, and/or machining. A cover (not shown) can be placed over the package 320, and can be fused or metallurgically bonded to the package 320. The polarizing beam splitter 110 optionally is mounted to the front of the package 320, and the detector array 126 or 208 can be mounted adjacent to the package 320 orthogonal to the array of light sources 302.

Each lens element 206 can be relatively small. For example, each lens element 206 can have a width dimension that is no more than 2.2 millimeters and a height dimension that is no more than 3.4 millimeters. Optionally, the lens elements 206 may have a larger width dimension and/or height dimension.

Figure 4:
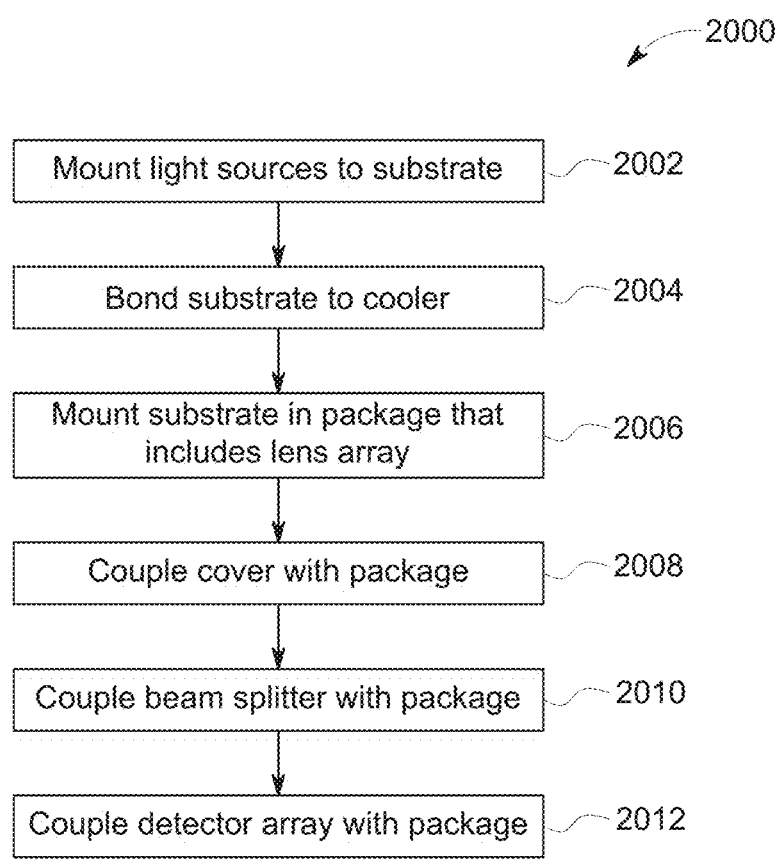
FIG. 4 illustrates a flowchart of a method for providing one or more embodiments of the LiDAR systems described herein.

FIG. 4 illustrates a flowchart of a method 2000 for providing one or more embodiments of the LiDAR systems described herein. At 2002, the light sources 302 are mounted onto the substrate 316. In one embodiment, the light sources 302 are mounted to the substrate 316 using pick-and-place bonding. At 2004, the substrate 316 is bonded to the thermoelectric cooler 318. At 2006, the substrate 316 is mounted in the package 320 that includes the lens array 106. The package 320 can be three-dimensional printed, injection molded, machined, or the like. At 2008, a cover is coupled with the package 320, such as by fusing, welding, or the like, the cover with the package 320. At 2010, a polarizing beam splitter is coupled with the package. At 2012, the detector array 126, 208 is coupled with the package 320.

Figure 5:
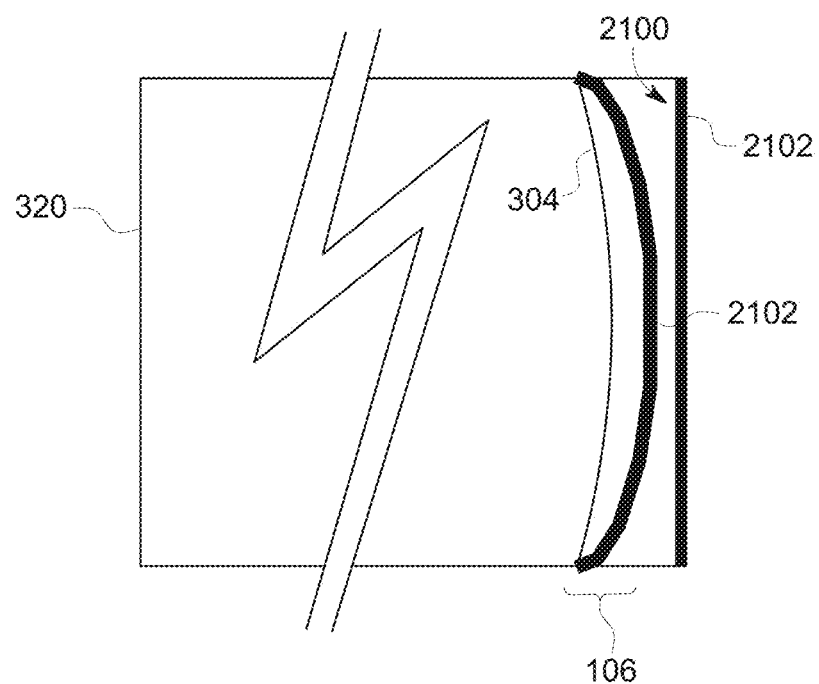
FIG. 5 illustrates one embodiment of the lenses in the lens array assembly and a package of the lighting assembly shown in FIG. 3.

FIG. 5 illustrates one embodiment of the lenses 304 in the lens array assembly 106 and the package 320 of the lighting assembly 300. The package 320 includes a window 2100, which represents a light-transmissive surface or part of the package 320. The window 2100 can be optically clear or otherwise allow light generated by the light sources 302 (shown in FIG. 3) and collimated and/or diffracted by the lenses 304 in the lens array assembly 106 to pass through the window 2100. The window 2100 can form an outer surface of the package 320. The remaining components of the system 300 are not shown in FIG. 5.

The lenses 304 and/or outer surface of the window 2100 can be coated with an antireflection layer 2102. This layer 2102 can have broadband omni-directional antireflection properties. The layer 2102 can be nanostructured and composed of nanopillar or nanowire arrays. The layer 2102 can be applied to one or both surfaces of the lenses 304 or window 2100, even though the layer 2102 is shown in FIG. 21 as only being disposed on one side of each of the lenses 304 and the window 2100. The layer 2102 can assist in improving the signal-to-noise ratio of the system 300 by increasing the amount of incoming light (reflected from outside objects) impacting the photodetectors 126, 208 (shown in FIGS. 1 and 2) in the system. In one embodiment, the layer 2102 is disposed on non-Fresnel and non-diffractive based lenses 304 in the system 300, but not on other lenses or surfaces of the lenses.

In yet another embodiment, the lenses and outer window of the LiDAR system are coated with a layer that possesses broadband omni-directional antireflection properties. This layer may be nanostructured and composed of nanopillar or nanowire arrays. The coating may be applied to one or both surfaces of the lenses or window layers, and helps in improving the SNR of the system by increasing the amount of incoming light (reflected from outside objects) impacting the photodetectors in the system. These coatings are primarily intended for the non-Fresnel and non-diffractive based lenses in the system.

In one embodiment, a LiDAR system includes light sources configured to generate separate beams of light, a lens array configured to receive the separate beams of light from the light sources and to collimate the separate beams of light into collimated outgoing light that is directed toward an examined area of interest, a light sensitive detector configured to sense reflection of at least part of the collimated outgoing light, and one or more processors configured to determine a distance to one or more objects off which the at least part of the collimated outgoing light was reflected toward the light sensitive detector. The one or more processors are configured to determine the distance based on the reflection of the at least part of the collimated outgoing light.

Optionally, the lens array is configured to collimate each of the separate beams of light in different directions. The different directions in which each of the separate beams of light are collimated by the lens array can include a horizontal direction and a vertical direction. The lens array can include plural lenses positioned to each receive a different beam of light from the separate beams of light.

In one example, the system also includes a polarizing beam splitter disposed between the lens array and a mirror assembly that directs the collimated outgoing light in one or more directions. The mirror assembly can include at least one moveable mirror configured to move and reflect the collimated outgoing light back-and-forth along a field of regard.

Optionally, the system also can include a thermoelectric cooler interconnected with the light sources. The system can include a window through which the collimated outgoing light passes after exiting the lens array, where the window includes an antireflection layer. The system also can include an antireflection layer on the lens array.

In one embodiment, another LiDAR system includes a lens array configured to receive separate points of light from light sources and to collimate the separate beams of light, a light sensitive detector configured to sense reflection of at least part of the light that is collimated, and one or more processors configured to determine a distance to one or more objects based on the reflection of the at least part of the light was reflected.

Optionally, the lens array is configured to collimate the separate beams of light in multiple different directions. The lens array can include plural lenses positioned to each receive a different point of light from the separate points of light. Each of the lenses can be configured to collimate the point of light received by the lens in both a first direction and a different, second direction.

Optionally, the system also includes a package having a window, where the lens array is disposed in the package and one or more of the lens array or the window includes an omnidirectional coating layer.

The system also can include a polarizing beam splitter disposed between the lens array and a mirror assembly that directs the light that is collimated in one or more directions. The system optionally can include a mirror assembly having at least one moveable mirror configured to move and reflect the light that is collimated back-and-forth along a field of regard. The mirror assembly can be configured to move the light that is collimated without moving the light sources. The mirror assembly can be configured to move the light that is collimated without moving the lens array.

In one embodiment, a method includes coupling light sources onto a heat spreading substrate, coupling the substrate to a thermoelectric cooler, and coupling the substrate in a package having a bonded, integral lens array disposed along one edge of the package. The lens array is configured to receive separate beams of light from the light sources and to collimate the separate beams of light in multiple, different directions.

Optionally, the light sources can be coupled to the substrate using pick and place bonding. The method also can include mounting a polarizing beam splitter to the package.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A light detection system comprising:
   light sources configured to generate separate beams of light;
   a lens array configured to collimate the generated separate beams of light into outgoing light collimated in both a horizontal direction and a vertical direction;
   a polarizing beam splitter disposed between the lens array and a mirror assembly, wherein at least a portion of the outgoing light travels through the polarizing beam splitter to the mirror assembly;
   the mirror assembly comprising a first scanning mirror configured to move and horizontally sweep the collimated outgoing light across an examined area of interest along the horizontal direction and a second scanning mirror configured to move and vertically sweep the collimated outgoing light across the examined area of interest along the vertical direction, movements sweeping the collimated outgoing light in the horizontal and vertical directions respectively, across a field of regard to reflect off an object;
   a detector configured to sense at least part of the reflected light, the at least part of the reflected light being reflected by the polarizing beam splitter to the detector; and
   one or more processors configured to determine a distance to the object based upon characteristics of the sensed reflected light.

2. The light detection system of claim 1, wherein the light detection system is a light detection and ranging (LiDAR) system.

3. The light detection system of claim 1, wherein the lens array includes plural lenses positioned to each receive a different beam of light from the separate beams of light.

4. The light detection system of claim 1, further comprising a polarizing beam splitter disposed between_the (i) lens array and (ii) the first scanning mirror and the second scanning mirror.

5. The light detection system of claim 1, wherein one or more of the first scanning mirror or the second scanning mirror is configured to sweep and reflect the collimated outgoing light back-and-forth across the field of regard.

6. The light detection system of claim 1, further comprising a thermoelectric cooler interconnected with the light sources.

7. The light detection system of claim 1, further comprising a window through which the collimated outgoing light passes after exiting the lens array, wherein the window includes an antireflection layer.

8. The light detection system of claim 1, further comprising an antireflection layer on the lens array.

* * * * *